(12) United States Patent
Bianco

(10) Patent No.: US 7,571,682 B2
(45) Date of Patent: Aug. 11, 2009

(54) SAFE CORRELATOR SYSTEM FOR AUTOMATIC CAR WASH

(76) Inventor: Archangel J. Bianco, 9 Shores Rd., Box 93, Brookside, NJ (US) 07926

( * ) Notice: Subject to any disclaimer, the term of this patent is extended or adjusted under 35 U.S.C. 154(b) by 307 days.

(21) Appl. No.: 11/500,151

(22) Filed: Aug. 7, 2006

(65) Prior Publication Data
US 2008/0028974 A1 Feb. 7, 2008

(51) Int. Cl.
*B08B 3/00* (2006.01)
(52) U.S. Cl. ........................... 104/242
(58) Field of Classification Search .......... 104/162, 104/172.3, 242
See application file for complete search history.

(56) References Cited

U.S. PATENT DOCUMENTS

| | | | |
|---|---|---|---|
| 3,252,429 A | 5/1966 | Atanasoff et al. | 105/150 |
| 4,178,948 A | 12/1979 | Swinehart | 134/45 |
| 4,342,387 A | 8/1982 | Gray | 198/746 |
| 4,715,287 A | 12/1987 | Wentworth et al. | 104/172.3 |
| 5,038,923 A | 8/1991 | Evans | 298/781.02 |
| 7,302,894 B2 * | 12/2007 | Belanger et al. | 104/242 |

* cited by examiner

*Primary Examiner*—S. Joseph Morano
*Assistant Examiner*—Robert J McCarry, Jr.
(74) *Attorney, Agent, or Firm*—Ernest D. Buff & Associates, LLC; Ernest D. Buff; Harry Anagnostopoulos

(57) ABSTRACT

A correlator system for automatic car wash has roller assemblies for supporting the front left and right wheels of a vehicle entering a car wash line. A set of guide rails or bars cooperate with the roller assemblies to adjust axial displacement and angular misalignment between the vehicle's front end and a conveyor track transporting the vehicle through the car wash facility. The rollers in the roller assembly rotate freely with minimal friction, axially displacing the front end of the vehicle and adjusting the angular misalignment of the front wheels. The low friction, easy-to-rotate rollers are provided with a plurality of braking elements that generate friction against the rollers, retarding their rotation when a worker steps thereon. The friction generated by the braking elements is insufficient to prevent roller rotation during alignment of the front end with the conveyor track. Injuries to car wash personnel caused by loss of balance when stepping on the rollers are virtually eliminated, and an accurate alignment of the vehicle's front end with the car wash conveyor track is reliably achieved.

16 Claims, 5 Drawing Sheets

SAFE CORRELATOR SYSTEM FOR AUTOMATIC CAR WASH

BACKGROUND OF THE INVENTION

1. Field of the Invention

The present invention relates to automatic car wash correlator systems having a plurality of low friction rollers designed to bring the front wheels of an automobile into alignment with the car wash drive tract; and, more particularly, to a correlator system, the safety of which is enhanced by providing the rollers with a braking device that prevents movement thereof when persons step or walk on the correlator.

2. Description of the Prior Art

Numerous patents disclose correlators and other wheel guiding systems for use in car washes and ship deck loading devices. The wheel position of the wheels an automobile must be aligned exactly with the mechanical drive track or handling machinery of the car wash, to move the vehicle through the car wash facility. The front end of the automobile drives over a set of low friction easy to rotate rollers, while the left side wheel of the automobile is physically displaced in the direction perpendicular to the vehicle movement direction. Displacement is effected by two converging guide bars that bring the left wheel into precise alignment with the mechanical drive track. Conventionally, the roller shafts are supported on low friction ultra high molecular weight polyethylene sleeve bearings. Rotation is initiated in response to wheel pressure and the guiding action of the guide bars. It may also be initiated inadvertently when a car wash operator steps on the rollers. Such inadvertent rotational motion of the rollers oftentimes causes the operators to lose their balance and fall or otherwise incur significant injury through contact with heavy metallic components, such as guide bars and the like, which are present in the surrounding area.

U.S. Pat. No. 2,085,329 to Porte discloses a device for loading and unloading wheeled loads on railway cars. A road vehicle is moved between two railway cars, one of which is a loading car and the other is the car on which a road vehicle is to be conveyed. A platform is fixed between the two railway cars and guiding means G along which the wheels slide during transfer. A plurality of rollers 21 are used below the wheel, providing relatively small friction to align the car from the loading car for movement to the conveyed railroad car. These low friction rollers are not provided with a friction generating element.

U.S. Pat. No. 3,467,310 to Fraser discloses a track means for wheeled vehicles. The track means guide and constrain a driverless vehicle in a car wash parking garage through use of a pair of treadways. Two longitudinally extending parallel strings of rollers extend along the top side of one of the treadways. The wheels on one side of the driverless vehicle are guided. The position of the driverless vehicle is changed by horizontal movement of wheel supports intermittently arranged along the path. The rollers are not provided with friction generating elements.

U.S. Pat. No. 3,942,720 to Crutchfield discloses a method and apparatus for controlling the movement of a vehicle along a prescribed path. A vehicle path controller has a plurality of cylindrical support rollers arranged in sections. The axis of rotation of each roller is substantially parallel to the prescribed path. An entrance ramp is positioned adjacent the initial roller section and facilitates the driving of the vehicle into the prescribed path. The rollers are rotatably connected to a framework and are conveniently arranged in two separate paths—one path for the left wheels and one path for the right wheels. Guide rollers are also connected to the framework but have an axis of rotation elevated with reference to the vehicle support rollers. The cylindrical support rollers are not provided with any friction generating device.

U.S. Pat. Nos. 5,167,044 and 5,177,825 to Belanger et al. disclose a compact drive-through vehicle wash. In this drive-through wash a vehicle is translated forwardly along a longitudinal axis that is representative of a conventional car wash system. The wash includes a frame affixed to the floor and sized to allow the vehicle to pass through. Right and left side washers are attached to the frame and are longitudinally aligned with one another for washing the right and left sides of the vehicle. Right and left side tire washers connected to the frame, and extending longitudinally generally parallel to the longitudinal axis, wash tires as the vehicle passes through the wash. A curtain washer is attached to the frame in lateral alignment with the right and left side washers and extends into the path of the vehicle. Right and left wraparound washers, each respectively having an elongated right and left booms are horizontally, pivotably attached to the frame on opposite sides, above the path of the vehicle, and extend rearward. Rotatable right and left wraparound wheels are supported on a pair of carriages that slide upon the elongated booms. The elongated booms pivot relative to the frame allowing the wraparound wheels to follow the contour of the vehicle passing through the wash. The overall assembly is a very compact apparatus that provides a relatively high quality wash in a limited time. The left wheel of the vehicle being washed is translated through the car wash. The patentee does not disclose how the left wheel of the vehicle being washed is brought into alignment with the conveyor.

U.S. Pat. No. 5,730,061 to Stufflebeam discloses an automatic conveyor system with damage-free guide rails. The guide rail assembly is adapted for use with a conveyor of an automatic car wash. It comprises a main guide rail positioned outside the conveyor proximate the wheel portion of a vehicle. A lower guide rail extends below and away from the main guide rail toward the conveyor such that the lower guide rail contacts the tire below the wheel portion to maintain a spaced apart relationship between the wheel portion and the main guide rail. The addition of the lower guide rail prevents scratching, marring, or any other structural damage to the wheel portion of the vehicle. A correlator has a plurality of parallel rollers 26 with their longitudinal axis along the vehicle travel direction. The left front wheel is guided by angular guides 24 to the conveyor. No friction generating device is provided for the plurality of parallel rollers.

An Internet disclosure by Sonny, manufacturers of correlators at http://www.sonnysdirect.com/system_models_detail__100.html, discloses a correlator used to align the vehicle at the entrance of the conveyor. This simple design involves a plurality of low friction of parallel rollers, which guide the left front wheel of a vehicle. A pair of guides lead the left front wheel to the conveyor. No disclosure is contained by the Sonny publication concerning correlator braking system comprising a plurality of springs associated with low friction, parallel rollers.

An Internet disclosure by PECO, manufacturers of correlators for a car wash, at www.pecocarwash.com/new_site/PECO%20MANUALS/ discloses the manual for a PECO P3ss stainless steel correlator. The rollers are arranged for the left front wheel and right front wheel along the direction of movement of the vehicle in the car wash system. The left wheels are guided by a pair of inclined guides and the front end of the vehicle moves laterally due to the low friction roller support of front left and right wheels. The rollers are supported by low friction ultra high molecular weight (UHMW)

polyethylene bushings, which have a very low coefficient of friction and thereby afford efficient roller movement against the stainless steel shafts of the rollers. These rollers are free running; so that a person stepping thereon will likely slip and fall. There are no friction generating devices provided in the roller assembly.

Notwithstanding the efforts of prior art workers to construct a correlator system that is safe to use and reliable in operation, no system has as yet been proposed which aligns a vehicle's tires with a car wash drive track and, at the same time, avoids hazards inherent to the very mechanism that facilitates the alignment process. Conventional correlator systems are made even more dangerous by the very features that operate to enhance movement of a vehicle's front end into alignment with the car wash conveyor drive. When car wash personnel walk across conventional correlators, the roller rotation inevitably triggered causes loss of balance and inadvertent contact with car wash machinery, which can lead to serious injury or even death. There is therefore a need in the art for a correlator system that is safe to use and highly reliable in operation—a correlator system which helps prevent operator injuries stemming from loss of balance, while providing satisfactory alignment of incoming vehicles with the car wash conveyor belt.

SUMMARY OF THE INVENTION

The present invention provides a correlator for a car wash that is reliable in operation and safe to walk on by car washing personnel. Such cross-correlator walking oftentimes occurs when the nozzles or other cleaning machinery of the car wash malfunction and require adjustment. The entrance to the car wash is the only place that water jets are not routinely used, and constitutes the location where personnel typically tend to walk across the car wash line. Advantageously, the correlators of the present invention equip the aligning rollers thereof with a frictional "braking" element that stabilizes the rollers and prevents their immediate rotation when a person steps on them. In the event that a car traverses the rollers, the shear weight of the car tire overcomes this braking friction provided by the frictional element. The rollers move freely, allowing the left front wheel to become aligned with the conveyor track as the guides laterally displace the front end of the vehicle, facilitating movement of the vehicle across the correlator rollers into the aligned position.

The frictional elements provided for retarding the rotation of the rollers may be a tangential brake or a radial brake. A tangential brake has a spring loaded brake pivotable plate element that contacts the circumference of the roller tangentially and applies force thereto, thereby retarding the rotation of a roller. A spring loaded radial brake has curved shoe elements that contact the interior or exterior circular surface of the rollers. In a preferred embodiment, the frictional elements are tangential brakes in which the braking load is applied by a tension or compression spring.

Generally stated, the rollers of a correlator are provided with friction generating elements that apply a pre-selected frictional load. The frictional load has a magnitude sufficient to prevent rotation of the rollers when a person walks on the upper surface of the correlator. On the other hand, the magnitude of the frictional force is especially adjusted to be sufficiently low so that correlator roller rotation, and hence lateral movement of the front end of a vehicle traversing the correlators, is readily effected. In addition, the frictional force exerted against the correlator rollers is set at a value low enough that lateral forces against the vehicle's front end, while being guided by the correlator guide bars, do not apply unduly high levels of stress on the vehicle's wheels or front end steering mechanism. This is easily accomplished through use of a pre-selected tension or compression spring having a known spring constants that load a pivotally connected plate member against the circumference of each roller.

In operation, the vehicle in a car wash is brought into a wide acceptance receiving location that has a guide bar adapted to capture the left front wheel of the vehicle. The floor of the capture region is provided with a plurality of stainless steel or galvanized steel rollers, which are disposed such that their longitudinal axes extend generally in the travel direction of the vehicle. The right hand wheel also rests on a similar set of low friction stainless steel or galvanized steel rollers. The stainless steel or galvanized steel axis of these rollers is mounted on low friction ultra high molecular weight (UHMW) polyethylene sleeve bearings. A very low coefficient of friction is thereby created between the stainless steel shaft or galvanized steel shaft and UHMW polyethylene sleeve bearings. This low coefficient of friction allows rotation of the rollers and facilitates movement of the entire front end of the vehicle into alignment with the conveyor drive in response to lateral forces exerted on at least one of the vehicle front wheels by one or more guide bar. The sleeve bearings operate effectively without grease or other lubrication. They function effectively in a dry or wet condition, and in the presence of detergents and other cleaning compositions. Due to the low friction of conventional correlator rollers, walking thereon is clearly not safe and likely to result in loss of balance leading to falls, injuries to car wash personnel, disruption of the car washing process with consequent downtime, increased liability insurance premiums and operating costs, and the like.

In accordance with the present invention, each of the correlator rollers is equipped with a friction generating element that retards the rotation of the rollers when a person walks across the line, preventing injury to car wash workers. The friction generating element may apply frictional force along a tangential direction or in a radial direction. A tangential friction generating element contacts a spring loaded pivotable flat plate bearing against the circumferential surface of the roller. A circumferential friction generating element has a spring loaded braking element, which is shaped as a segment of a circle and contacts the inner surface of a roller. A tangential friction generating element is preferred since it is easier to adjust the frictional force delivered to the roller.

In the first embodiment, the rollers are substantially parallel to each other, as with prior are correlator rollers; but each of these rollers is provided with a friction generating element. Preferably, such an element is a tangential friction generating element. These friction generators are mounted close to one side of the roller, where the roller is supported by a UHMW polyethylene sleeve bearing. When the guide bar pushes the left front wheel into alignment with the conveyor, the front end of the vehicle slides laterally, overcoming the frictional force provided by the friction generating element. This sliding lateral movement is smooth, since the right side wheel is also placed on a set of parallel rollers similar to the left side front wheel. With this arrangement, contact between the rollers and the wheels tends to continue for a given roller along its length.

In the second embodiment, the rollers are slightly inclined to each other with the wider end being located at the receiving end of the correlator and tapering to a narrower configuration towards the discharge end of the correlator. The inclined rollers mimic the directionality of guide bars, forcing the vehicle left wheel to line up with the conveyor. The left wheel of the vehicle thus shifts roller contact, moving from one roller to the next as the wheel moves along a guided path in response to lateral forces exerted thereon by the guide bar. During this movement, the load of the vehicle is shared by a plurality of adjacent rollers. This reduces the overall wear of the UHMW polyethylene bearings, improving service life of the correlator. The right side wheel may be supported by inclined rollers or parallel rollers, but no guide bar is required to guide the right wheel.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

Figure 1:
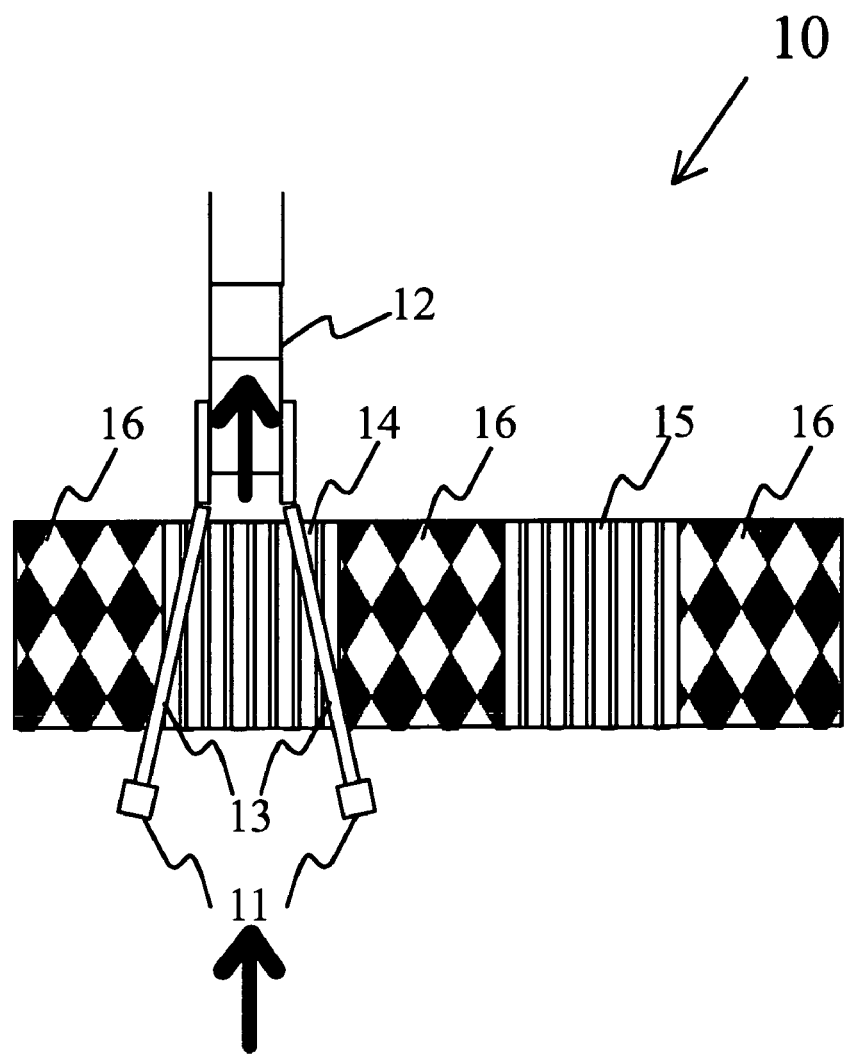
FIG. 1 is a schematic diagram of a conventional correlator.

The present invention provides a safe, reliable and economical correlator system for an automatic car wash. The correlator system is used in an automatic car wash move the front wheels of an automotive vehicle into a position of alignment with the conveyor mechanism that drives the car through the machinery of the car wash. The conveyor system carries the front and left wheels of the car while the right wheels coast along through the car wash. It is a necessary prerequisite that the left wheels of a vehicle appointed for passage through the car wash be substantially parallel to and aligned with the conveyor track. This is accomplished by the correlator. In general, land vehicles brought into a car wash are not precisely in alignment with the car wash conveyor track. This misalignment typically takes the form of axial displacement or angular misalignment. In order to overcome this problem, most car wash facilities utilize a correlator, which is provided with a bed of free-to-rotate, low friction rollers located directly below the front left wheel and front right wheel of a vehicle appointed for alignment with the car wash conveyor. The left wheel portion of the correlator is provided with two guide bars that are inclined to each other, forming a capture region that is larger than the exit region. The guide bars exit region is spaced at a distance equal to the conveyor traction device. Due to the larger distance between the guide bars at the entrance region, the left wheel is captured regardless of axial displacement or angular misalignment. The left wheel contacts the guide bars and is coaxed into alignment—a process that requires axial displacement of the vehicle's front end and correction of angular misalignment. Such a process is carried out by the rotation of rollers directly below the vehicle's front left and right wheels. This task is accomplished by housing the rollers within a sleeve especially adapted to provide a low-friction bearing support that limits application of stresses to the front end of the automotive vehicle. The rollers and the shaft supporting the rollers are made from corrosion resistant stainless steel or galvanized steel that works reliably in a car washing environment involving use of aggressive, corrosive fluids. In the past packed ball bearings have been used to support the stainless steel or galvanized steel roller shaft. Oftentimes, corrosion causes these bearings to stick; and the car washing operation stops when the incoming vehicles are not properly aligned with the conveyor track. Recent developments have resulted in the use of ultra high molecular weight (UHMW) polyethylene sleeve bearings that provide for rotation of the rollers with very little or minimal friction. These UHNW sleeve bearings operate without need for any lubrication such as grease or oils. Further, the low friction properties of these bearings are maintained even under wet conditions with aggressive cleaning chemicals. The use of UHMW sleeve bearings have become standard in the industry as evidenced by car wash machinery manufacturers such as Sonny, McNeil, Peco and the like. Unfortunately, the very same low friction rotation properties of the rollers causes a severe injury hazard for workers who sometimes need to cross the car washing line to inspect or fix jet locations etc. Stepping on these low friction rollers causes loss of balance. Workers that fall in this environment can be injured by contact with large protruding objects such as guide rolls, and the like. Such inadvertent contact can, in turn, result in bone fractures, concussions and other injuries that present severe worker health consequences.

The present invention provides friction generating elements for each of the correlator rollers that support the vehicle's front left and right wheels. The magnitude of the friction generated is adequate to prevent turning of the rollers under the weight of a car wash worker. On the other hand, it is inadequate to prevent roller rotation in response to the weight of a vehicle's front end. The relatively large differential between the weight of a human as compared to the weight of an automotive vehicle is used to create, in effect, a braking—non-breaking condition. The friction generating element may be a tangential braking element or a radial braking element. The tangential braking system takes the form a spring loaded, pivotable plate which contacts the circumference of a roller to retard its rotation. A radial braking system comprises a spring loaded, curved element, similar to a segment of a circle, which contacts either the interior or the exterior surface of a roller.

In the first embodiment of the invention, the friction generating elements are attached to each of the rollers supporting the left and right wheel of an automobile appointed for passage through the automatic car wash. These rollers are positioned essentially parallel to each other in a manner conventional with commercial car washing machines, such as those produced by Peco, Sonny or McNeil, for example. Preferably, the friction generating element is a tangential brake. A pivotable spring loaded plate contacts the external circumferential surface of a roller, retarding its rotation in response to a load equivalent to a person stepping on the roller. The spring constant of the spring is selected to provide this required friction. However, such friction is insufficient to prevent roller rotation when a land vehicle is driven onto the roller set. In such a case, the rollers rotate freely while the vehicle undergoes adjustment, including axial displacement and angular alignment in response to lateral forces exerted thereon by the correlator guide bars.

In the second embodiment of the invention, the friction generating elements are attached to each of the rollers supporting the left and right wheel of an automobile appointed to enter the automatic car wash process. These rollers are slightly inclined with respect to each other, so that a larger distance exists between the rollers at the entrance capture portion of the correlator. The distance between the rollers decreases at the exit portion of the correlator, where the automobile left front wheel is delivered to the conveyor track. Due to the angle between the rollers, the left front wheel contacts rollers in a sequence instead of using one single roller. This distributes the load of the vehicle, reducing the wear of rollers and their support bearings and prolonging correlator service life. Due to the improved service life of the UHME sleeve bearings, reduced friction is realized. The set of rollers supporting the front right wheel may also be inclined in the manner of the set of rollers supporting the left front wheel. This construction is intended for use in lieu of a construction wherein the correlator comprises a set of substantially parallel rollers. Rollers of this configuration are not utilized in commercial car washing machines such as those produced by Peco, Sonny or McNeil. Preferably, the friction generating element for each of these inclined rollers is a tangential brake. In such braking apparatus, a pivotable spring loaded plate contacts the external circumferential surface of a roller, retarding its rotation at a load equivalent to a person stepping on the roller. The force constant of the spring is selected to provide this required friction. On the other hand, such friction is insufficient to prevent rotation of the roller when the automobile vehicle is driven on the roller set and is adjusted to effect axial displacement and angular alignment in response to lateral forces exerted thereon by the guide bars.

FIG. 1 illustrates generally at 10 a conventional correlator system of the type used by Peco, Sonny or McNeil car washing systems. An automobile vehicle's left front wheel enters the correlator along the direction of the arrow at 11 aided by entrance guide rail bumpers. The automobile vehicle exits the correlator in alignment with the conveyor track at 12 along the direction of the arrow, proceeding into the car wash machinery. The guide rails or bars 13 adjust the axial displacement of the left front wheel and its angular misalignment so that the left wheel of the automobile vehicle aligns with the conveyor track at 12 with supporting guide rails. The left side front wheels of the land vehicles are supported by a plurality of rollers 14 mounted on low friction UHMW polyethylene sleeve bearings (not shown). These rollers are arranged substantially parallel to each other and are oriented in the travel direction of the vehicle into the car washing machine, as indicated by the arrow. Similarly, the right side front wheel of the vehicle is supported on a plurality of similar parallel rollers 15. Like rollers 14, the rollers 15 are substantially parallel to the vehicle travel direction and are supported by a set of low friction UHMW polyethylene sleeve bearings. When the left wheel is coerced for axial displacement or correction of angular misalignment by the guide rails or bars 13, the front end of the automobile vehicle moves left to right and the wheels are turned by the rotation of these supporting rollers 14, 15. The portion between the left wheel supporting and right wheel supporting roller assembly is a conventional diamond steel plate 16. The force needed for this adjustment is relatively low, due to the low friction rotational characteristics of the supporting rollers. Once the front end is properly positioned, the rear wheels simply follow along onto the conveyor track. Conventional correlator rollers are free to rotate at minimal loading. Consequently, persons attempting to walk over the rollers will likely lose their footing and fall, thereby incurring an injury.

Figure 2:
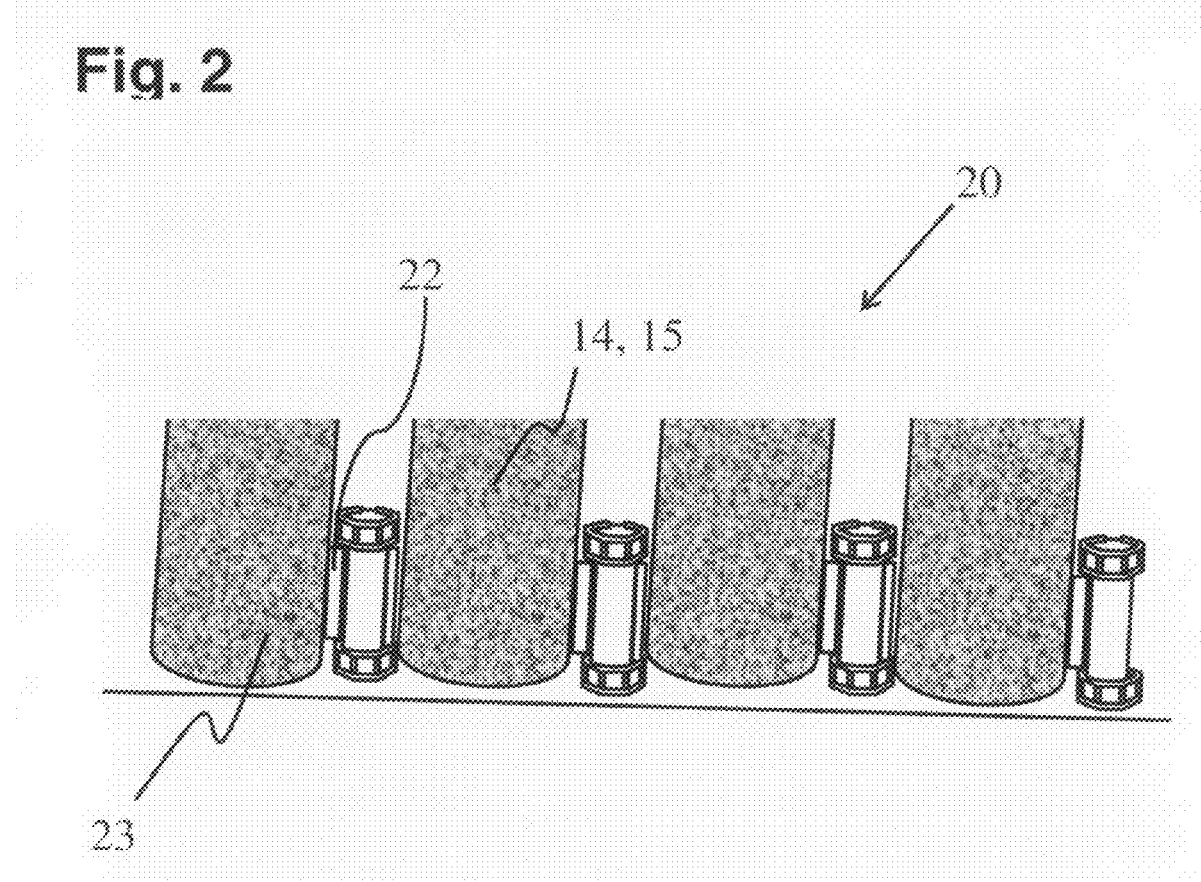
FIG. 2 is a photograph of the driving surface of a correlator constructed in accordance with the present invention, wherein each roller is provided with a tangential friction generating element.

FIG. 2 shows generally at 20 a partial photograph of the driving surface of the rollers for the left front wheel support or right front wheel support according to the subject invention.

The guide rails or bars are attached with this roller arrangement, when it is used for supporting the left wheel of the automobile vehicle. Each of the rollers 14 or 15 is provided with a friction generating element. In the embodiment shown by FIG. 2, there is used a tangential friction element comprising a spring loaded pivotable plate 22, which contacts the circumferential outer surface 23 of the roller, retarding its rotation when stepped on by a person walking across the car wash line.

Figure 3:
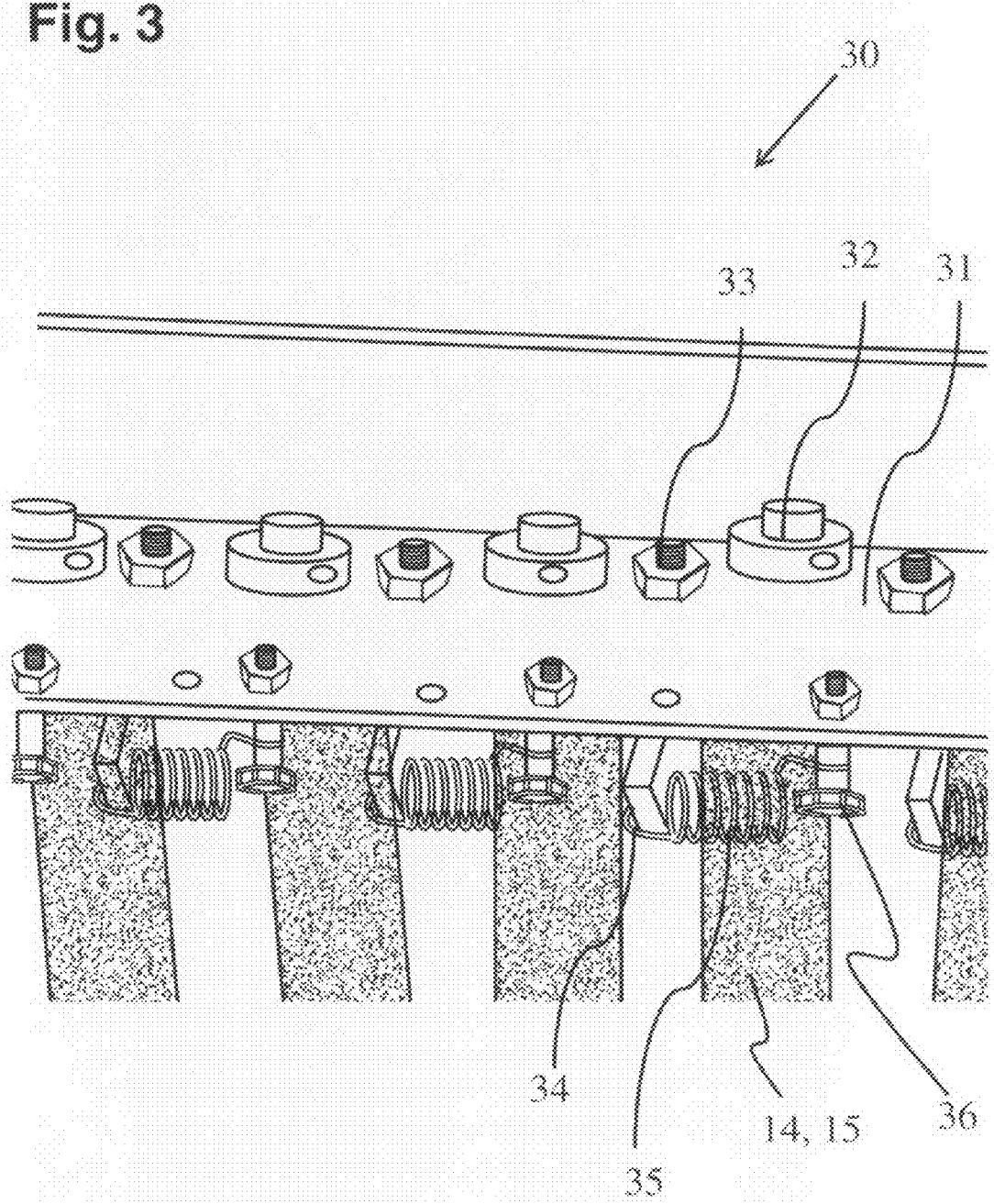
FIG. 3 is a photograph of the reverse surface of the correlator shown in FIG. 2, illustrating the arrangement of spring loaded pivoted plates for applying tangential frictional force to the rollers.

FIG. 3 shows generally at 30 a photograph of the reverse surface of the correlator's rotating rollers, showing the details of the pivotable plate and its spring loading. Due to this spring loading, a tangential force is applied to the circumferential external surface of each roller, generating friction that prevents injury to a car wash worker. The frame of the roller retainer is shown at 31. The bearing mechanism for the rollers, shown at 32, comprises a UHMW polyethylene sleeve bearing and an end cap. A pivot bolt and nut 33 are used for attaching a pivotable plate 34. The plate 34 has a circular hole formed therefrom. A flat portion and the pivot bolt passes through the circular hole forming a pivot for the plate, while the flat portion of the plate contacts the external circumferential surface of a roller 14 or 15. A spring 35 loads the pivotable plate and is attached at one end to the plate 34 and to a bolt 36, as shown.

Figure 4:
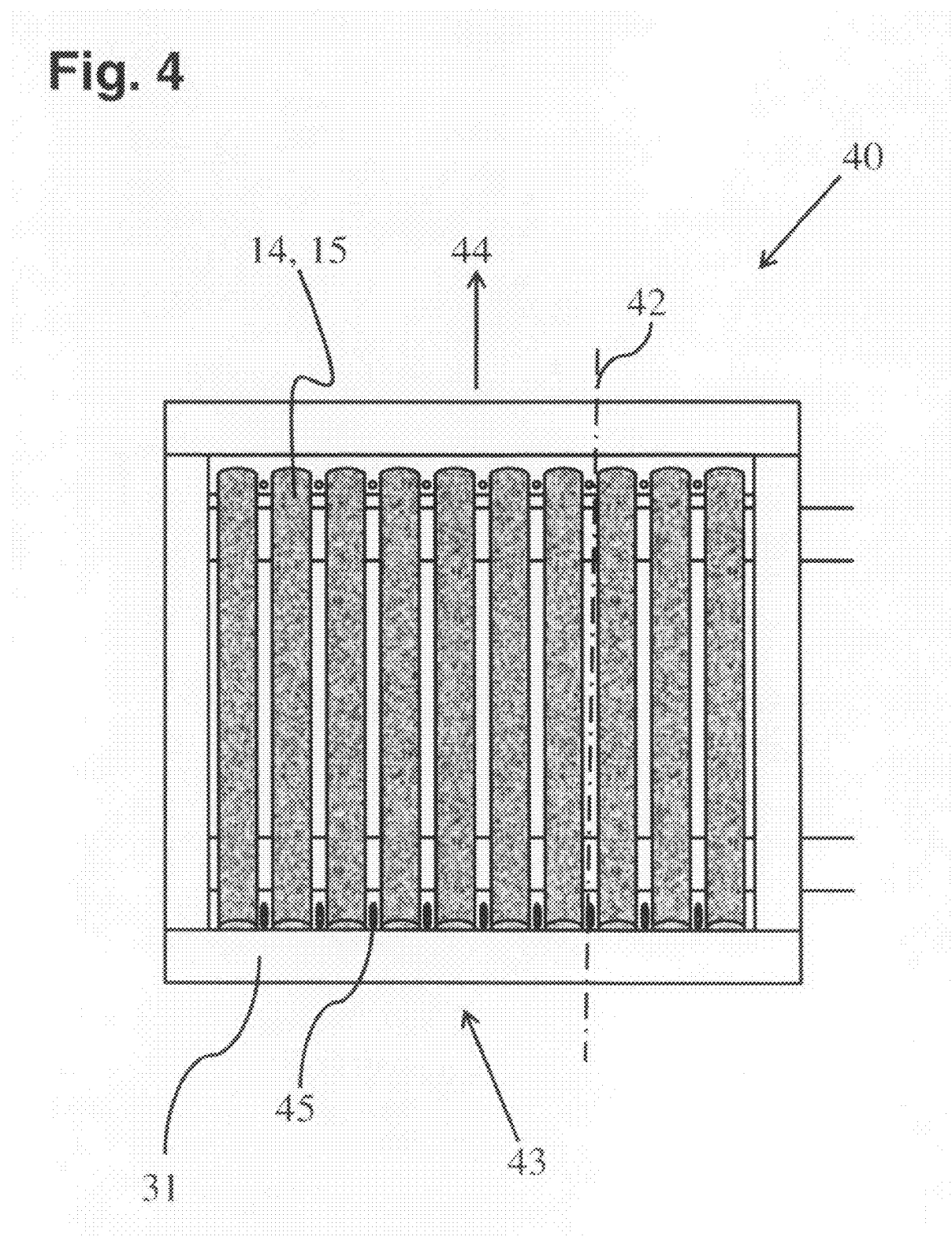
FIG. 4 is a photograph of the driving surface of a second embodiment of the invention, wherein the rollers are inclined to each other to assist alignment of the vehicle with the conveyor.

FIG. 4 shows at 40 a photograph of the second embodiment of the invention wherein the rollers 14, 15 are inclined to each other instead of being parallel, as depicted in FIG. 1. The wider portion is at the entrance to the correlator, while the exit portion that delivers the automobile left front wheel to the conveyor belt is disposed at the narrower end. The frame of the rollers for either left front wheel support or right front wheel support is shown at 31. The rollers 14 or 15 are clearly inclined to each other. The line 42 indicates the general driving direction of the vehicle onto the correlator. The bottom portion of the correlator 43 indicates the entry point of the vehicle onto the correlator. Upon undergoing lateral adjustment and alignment, the vehicle exits correlator 43 at the top portion 44. The friction generating elements are shown at 45, and are located well below the driving surface of the correlator assembly. Due to this inclination of the rollers, the wheel contacts different rollers as it moves forward, distributing the loading to adjacent rollers one at a time and thereby reducing wear on the UHMW polyethylene bearing and prolonging the in-service life of the correlator mechanism.

Figure 5:
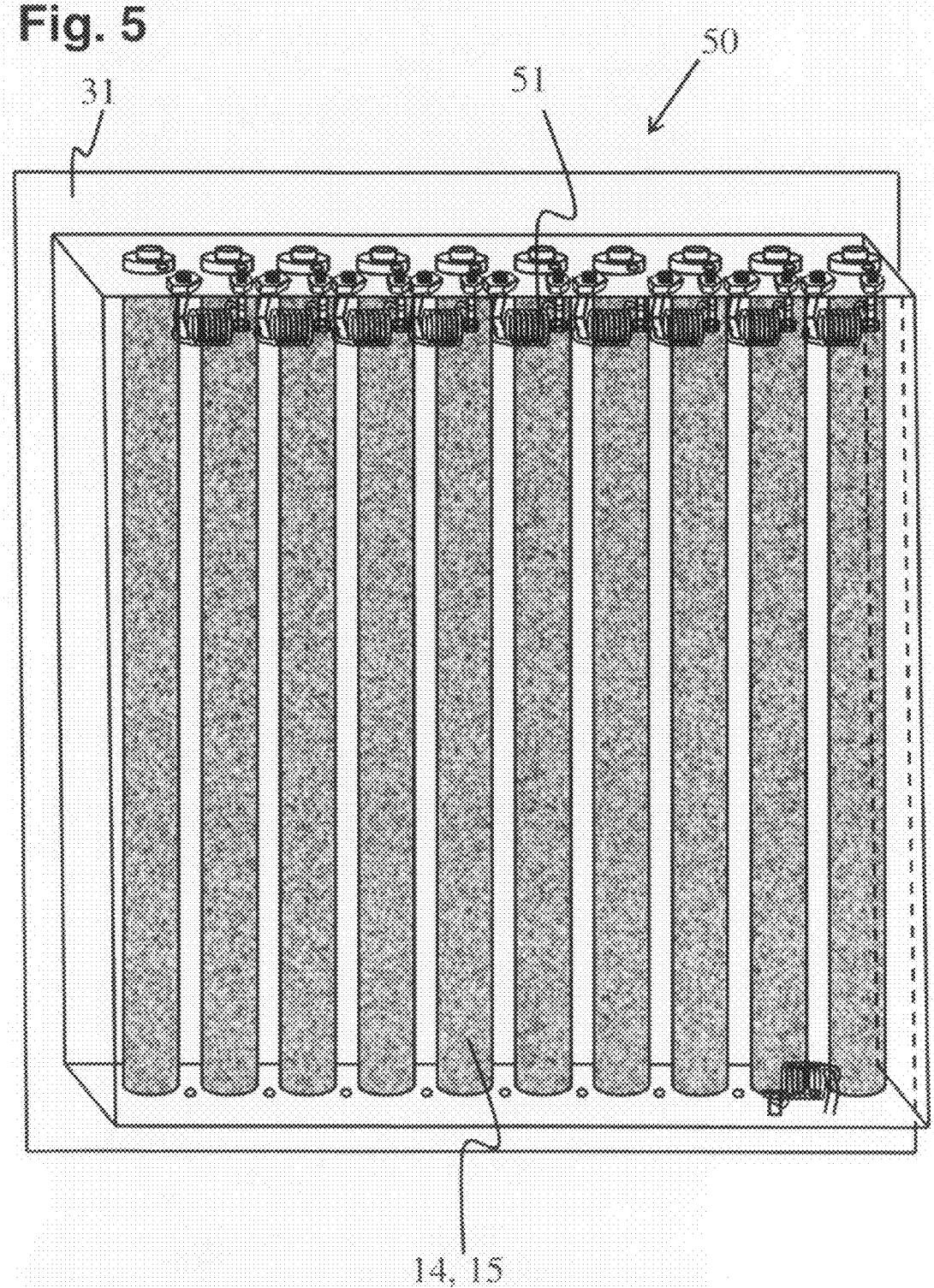
FIG. 5 is a photograph of the reverse surface of the second embodiment of the invention, wherein the rollers are inclined to each other to assist lining up of the vehicle with the conveyor.

FIG. 5 is a photograph showing generally at 50 the reverse side of the inclined roller configuration depicted by FIG. 4. The frame of the roller assembly is shown at 31 and supports rollers 14 or 15. The friction generating mechanism 51 comprises a spring loaded pivotable plate in contact with the external circumferential surface of the roller, as detailed in FIG. 3.

The safe, reliable automatic car wash correlator system comprises the following features, in combination:

1) A plurality of low friction easy to roll steel rollers mounted on a frame, forming a roller assembly located between a vehicle entrance and a conveyor track;
2) said low friction being provided by ultra high molecular weight (UHMW) polyethylene steel bearings, which support steel shafts of the steel rollers;
3) the rollers being oriented essentially along the direction of travel of a land vehicle into a car wash station, and supporting the vehicle's left and right front wheels;
4) each roller of said roller assembly being provided with a friction generating element adapted to generate sufficient frictional force to retard the rotation of said rollers when a car wash worker steps on said roller assembly;

5) said frictional force being insufficient to prevent the rotation of said rollers when a land vehicle's left front wheel is being aligned with a conveyor track;
6) said friction generating element comprising a tangential brake having a spring loaded pivotable plate adapted to contact the external circumferential surface of the roller retarding rotation when stepped on by a car wash worker;
7) said friction generating element comprising a radial brake having curved shoe brakes contacting interior or exterior circular surface portions of said rollers;
8) said rollers being substantially parallel to each other;
9) said rollers being inclined to each other with the wider end of roller assembly residing at the entrance to the car wash and the narrow end residing at the entrance to the conveyor track;
whereby the left front wheel of the automobile vehicle in contact with a roller assembly and the right front wheel on a second roller assembly are guided by guide rails or bars to the conveyor track by lateral forces operative to adjust axial displacement or angular misalignment.

Having thus described the invention in rather full detail, it will be understood that such detail need not be strictly adhered to, but that additional changes and modifications may suggest themselves to one skilled in the art, all falling within the scope of the invention as defined by the subjoined claims

What is claimed is:

1. A correlator system for an automatic car wash, comprising:
   a. a pair of roller assemblies one for supporting a left front wheel and the second for supporting a right front wheel of a land vehicle placed between a vehicle entrance location to said car wash and a conveyor track location for transporting said left front wheel of said land vehicle through said car wash;
   b. a plurality of guide rails or bars disposed above said roller assembly supporting said left front wheel for guiding said left front wheel by exerting lateral forces on said left front wheel to adjust axial displacement and angular misalignment thereof;
   c. said roller assembly having a plurality of steel rollers having longitudinal axes oriented to extend in the general direction of movement of said land vehicle;
   d. said steel rollers with steel shafts being supported on ultra high molecular weight (UHMW) polyethylene sleeve bearings that facilitate low friction rotation of said rollers;
   e. friction generating means associated with said steel rollers for generating friction against said rollers, said friction having a magnitude sufficient to retard rotation of said rollers when stepped on by a car wash worker;
   f. said friction generating means comprises a tangential brake having a spring loaded pivotable plate that contacts an external circumferential surface of at least one of said rollers;
   g. said magnitude of said friction being insufficient to prevent rotation of said steel rollers when said land vehicle is driven onto said guide rails or bars, thereby enabling said adjustment of axial displacement and angular misalignment of said left front wheel;
   whereby injury to car wash workers is mitigated by said friction generating means, and said land vehicle is reliably moved into a position of alignment with said conveyor track.

2. The correlator system for an automatic car wash as recited by claim 1, wherein said steel roller is a stainless steel roller.

3. The correlator system for an automatic car wash as recited by claim 1, wherein said steel roller is a galvanized steel roller.

4. The correlator system for an automatic car wash as recited by claim 1, wherein said steel shaft is a stainless steel shaft.

5. The correlator system for an automatic car wash as recited by claim 1, wherein said steel shaft is a galvanized steel shaft.

6. The correlator system for an automatic car wash as recited by claim 1, wherein said roller assembly has rollers parallel to each other.

7. The correlator system for an automatic car wash as recited by claim 1, wherein said roller assembly has a plurality of rollers inclined to each other to form a plate array, a wider portion of said plate array being disposed at said vehicle entrance location and a narrower portion of said plate array being disposed at said conveyor track location.

8. The correlator system for an automatic car wash as recited by claim 7, wherein said inclined rollers contact said left or right front wheel of said automotive vehicle, distributing vehicle load between adjacent rollers and reducing overall wear of said UHMW polyethylene bearings to thereby prolong said correlator system's in-service life.

9. The correlator system for an automatic car wash as recited by claim 1, wherein said friction generating means comprises a plurality of tangential brakes, each of said brakes has a spring-loaded pivotal plate, and each of said plates is in contact with an external circumferential surface of a different one of said rollers, whereby each of said rollers is individually controlled.

10. A correlator system for an automatic car wash, comprising:
   a. a pair of roller assemblies one for supporting a left front wheel and the second for supporting a right front wheel of a land vehicle placed between a vehicle entrance location to said car wash and a conveyor track location for transporting said left front wheel of said land vehicle through said car wash;
   b. a plurality of guide rails or bars disposed above said roller assembly supporting said left front wheel for guiding said left front wheel by exerting lateral forces on said left front wheel to adjust axial displacement and angular misalignment thereof;
   c. said roller assembly having a plurality of steel rollers having longitudinal axes oriented to extend in the general direction of movement of said land vehicle;
   d. said steel rollers with steel shafts being supported on ultra high molecular weight (UHMW) polyethylene sleeve bearings that facilitate low friction rotation of said rollers;
   e. friction generating means associated with said steel rollers for generating friction against said rollers, said friction having a magnitude sufficient to retard rotation of said rollers when stepped on by a car wash worker;
   f. said friction generating means is a radial brake comprising a spring loaded curved shoe brake that contacts an internal or external circumferential circular surface of at least one of said rollers;
   g. said magnitude of said friction being insufficient to prevent rotation of said steel rollers when said land vehicle is driven onto said guide rails or bars, thereby enabling said adjustment of axial displacement and angular misalignment of said left front wheel;

whereby injury to car wash workers is mitigated by said friction generating means, and said land vehicle is reliably moved into a position of alignment with said conveyor track.

11. The correlator system for an automatic car wash as recited by claim 10, wherein said steel roller is a stainless steel roller.

12. The correlator system for an automatic car wash as recited by claim 10, wherein said steel roller is a galvanized steel roller.

13. The correlator system for an automatic car wash as recited by claim 10, wherein said steel shaft is a stainless steel shaft.

14. The correlator system for an automatic car wash as recited by claim 10, wherein said steel shaft is a galvanized steel shaft.

15. The correlator system for an automatic car wash as recited by claim 10, wherein said roller assembly has rollers parallel to each other.

16. The correlator system for an automatic car wash as recited by claim 10, wherein said roller assembly has a plurality of rollers inclined to each other to form a plate array, a wider portion of said plate array being disposed at said vehicle entrance location and a narrower portion of said plate array being disposed at said conveyor track location.

* * * * *